(No Model.) 2 Sheets—Sheet 1.
J. B. WALKER.
SHINGLE SAWING MACHINE.
No. 557,458. Patented Mar. 31, 1896.
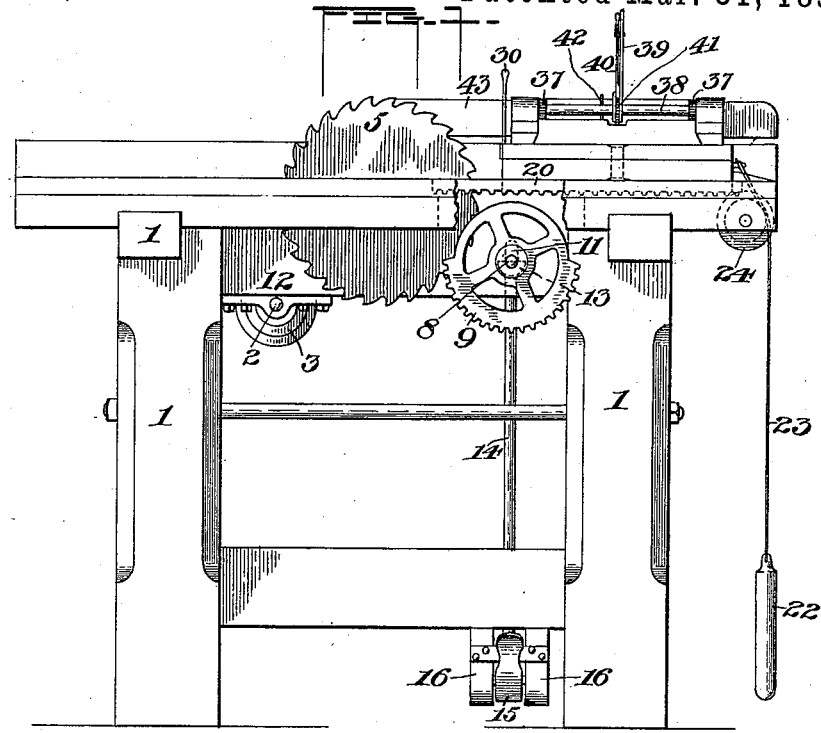
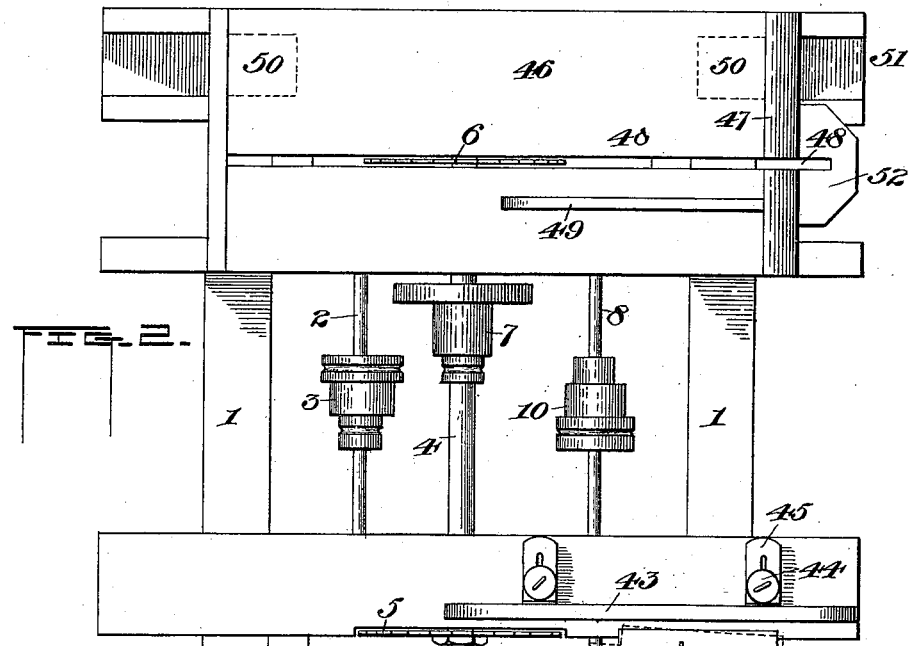
Witnesses
C. W. Smith
Alfred T. Gage
Inventor
John B. Walker,
by
W. S. Hardman
Attorney

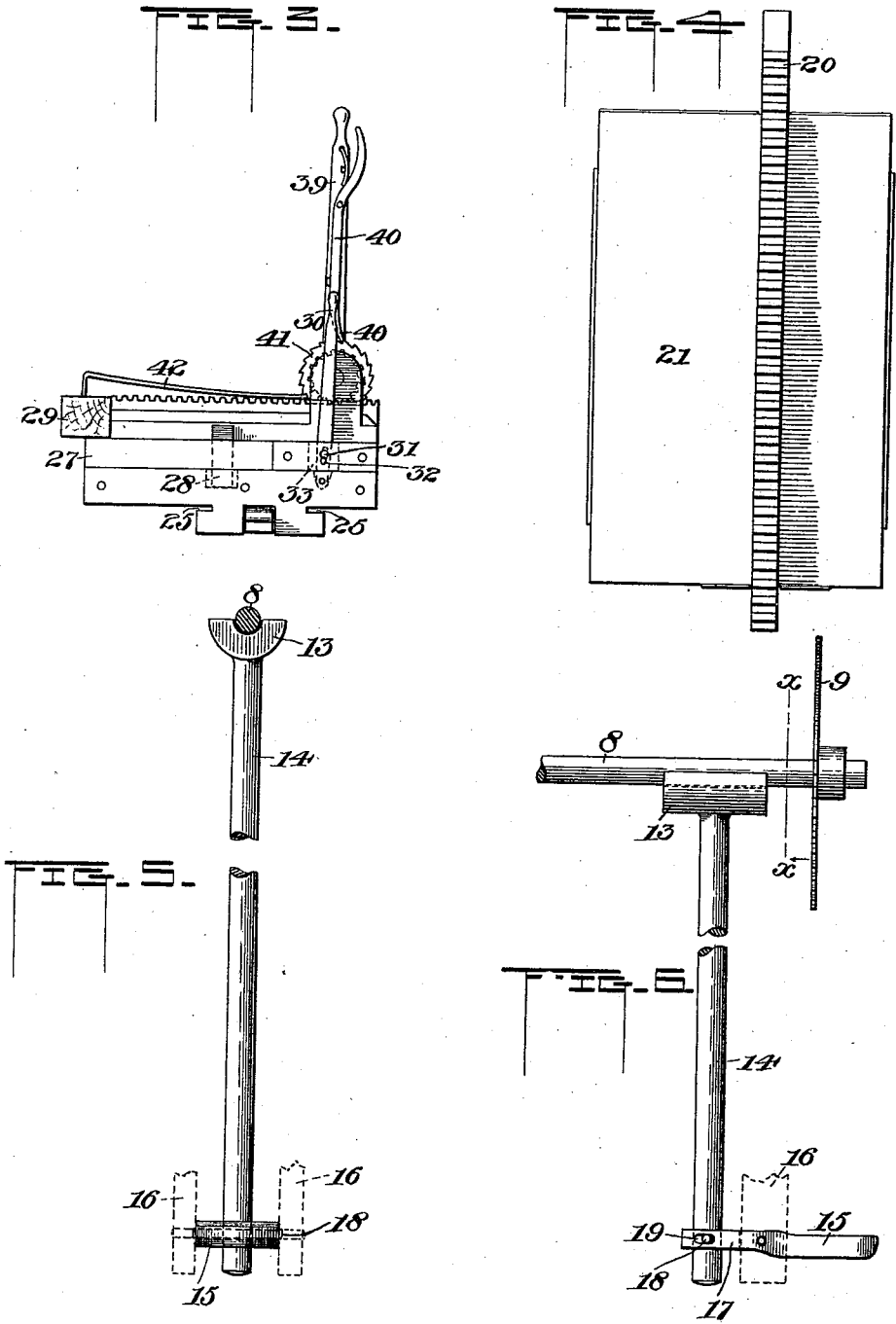

UNITED STATES PATENT OFFICE.

JOHN B. WALKER, OF HELENA, ALABAMA.

SHINGLE-SAWING MACHINE.

SPECIFICATION forming part of Letters Patent No. 557,458, dated March 31, 1896.

Application filed October 25, 1895. Serial No. 566,888. (No model.)

*To all whom it may concern:*

Be it known that I, JOHN B. WALKER, a citizen of the United States, residing at Helena, in the county of Shelby and State of Alabama, have invented certain new and useful Improvements in Shingle-Sawing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to sawing-machines, more particularly to machines for sawing shingles, but which at the same time is adapted to saw timber into blocks intended to serve as bolts from which shingles may be subsequently sawed in the same machine, although the part of the machine designed for sawing the timber into blocks may be used for sawing palings, staves, and other articles from the timber.

The object of the invention is primarily to provide improved means for moving the shingle-bolt up to the saw transversely thereto; also to provide improved means for turning the shingle-bolt carrier so as to present the bolt at different angles to the saw in order to present the bolt at the proper angle for having the shingles cut therefrom; also to provide improved means for moving the shingle-bolt carriage to and from the saw, parallel therewith, and it has further to improve the machine in features of construction and arrangement of parts, all of which will be hereinafter particularly set forth.

To the accomplishment of the foregoing objects thus specifically and in general terms referred to, the invention consists in the construction and in the combination of parts hereinafter particularly described and then sought to be specifically defined by the claims, reference being had to the accompanying drawings, forming a part hereof, and in which—

Figure 1 is a side elevation of the machine; Fig. 2, a plan view of the same; Fig. 3, a side view of the bolt-carriage and adjusting mechanism; Fig. 4, a bottom plan view of the bolt-carriage, showing the rack-bar on the bottom; Fig. 5, a detail view showing the pitman or rod, in the upper end of which rests the shaft of a mutilated gear hereinafter described and by which said gear is thrown into and out of engagement with the rack-bar on the bottom of the bolt-carriage; and Fig. 6 is a view of the same parts taken at right angles to Fig. 5 and showing an edge view of the mutilated gear on its shaft, Fig. 5 having the mutilated gear-shaft in section on the line $x\,x$ of Fig. 6.

In the drawings, the numeral 1 designates the frame of the machine, and in which is journaled in suitable bearings the shaft 2, provided with a pulley 3 for deriving power from any suitable source; the shaft 4, which carries at opposite ends the saws 5 and 6, and provided with a pulley 7 to derive power from the pulley 3 through a belt which is not shown, and a shaft 8, which carries at one end a mutilated gear 9, and provided with a pulley 10 to derive power through a belt (not shown) which will connect the pulleys 3 and 10. One end of the shaft 8 will pass through a vertical slot or way 11 (shown by dotted lines on Fig. 1 of the drawings) and formed in a transverse timber 12 of the machine, so that said shaft is made capable of being raised and lowered at one end, at which it is provided with a mutilated gear 9, the opposite end of said shaft fitting in its bearing so as to permit movement of the shaft.

The shaft 8, at the end where it is provided with the mutilated gear 9, rests in a semicircular bearing or box 13 carried at the upper end of a rod 14, which at its lower end is supported by a foot-lever 15, which may be fulcrumed to brackets 16 and have a collar or yoke 17, which may straddle the lower end of the rod or pitman 14, as illustrated in Figs. 5 and 6, and attached to said pitman or rod by means of pins 18 projecting from the pitman and passing through slots 19 in the yoke of the foot-lever. By this construction when it is desired to place the mutilated gear 9 in position to operate in connection with a rack-bar 20 attached to the under side of the bolt-carriage 21, so as to move the carriage to the saw 5, it is only necessary to press down on the lever 15 with the foot, when the pitman or rod 14 is lifted and the mutilated gear raised to a position where in its rotation its teeth will mesh with the teeth of the rack-bar 20 and thus move the bolt-carriage forward and bring the bolt against the teeth of the saw, so that the shingle will be sawed from the bolt.

The mutilated gear 9 is of such form that its teeth will engage with the rack-bar 20 until the carriage has been moved far enough to entirely sever the shingle from the bolt, and by the time that has been effected the teeth of the gear have left the rack-bar and the smooth or toothless portion of the gear brought next to the rack-bar, thus releasing the bolt-carriage and permitting it to be automatically retracted by suitable means—for instance, by means of a weight 22 suspended by cord 23 from the end of the bolt-carriage, as illustrated clearly in Fig. 1, said cord being guided by a sheave 24 attached to the machine-frame and located substantially as shown in Fig. 1 of the drawings. This retraction of the bolt-carriage brings the latter to its normal position, and by the time it has been brought thereto the mutilated gear has revolved sufficiently to again bring its teeth into mesh with the teeth of the rack-bar, so as to again feed the bolt-carriage forward to the saw. This operation continues in succession so long as the mutilated gear is held in its raised position by pressure of the foot on the pedal or lever 15. The bolt-carriage 21 has formed on its bottom face inwardly-extending recesses 25, into which fit the edges of the opposite parallel guide or track rails 26 secured to the top of the machine-frame, as illustrated in Fig. 2 of the drawings.

On top of the bolt-carriage 21 is placed a platform 27, which is pivoted to the carriage by pivot-pin 28, so as to permit the platform to be partially rotated on top of the carriage, thus permitting the edge of the shingle-bolt 29 to be presented at an angle to the plane of the saw 5, so as to cut the shingle from the block, with its butt-end thicker than the opposite end, the position of the block when thus placed being indicated by dotted lines in Fig. 2 of the drawings. The platform is partially rotated for the purpose just mentioned by means of a hand-lever 30 pivoted at its lower end to the forward end of the bolt-carriage and connected to the rotatable platform by means of a pin 31 projecting therefrom and entering a slot 32 in the lower portion of the lever, so as to permit a partial rotation of the platform sufficient to bring the shingle-bolt to the angle necessary for the purposes stated, said lever passing through a guide 33 on the end of the platform, which guide is of sufficient width to allow the lever to have sufficient play to permit the platform to rotate.

The shingle-bolt is placed upon the platform 27 between parallel guides 34 at opposite sides of the platform, and is fed forward as the shingles are cut therefrom by means of a plunger 35, which preferably is formed of a rectangular metal frame fitted between the guides 34 and formed with cog-teeth 36 on the top face of the sides of said plunger or follower, with which cog-teeth will engage the tooth-wheels 37 on a shaft 38, journaled in suitable bearings on the guides 34, as illustrated clearly in Fig. 2 of the drawings. The shaft 38 and its cog-wheels are turned so as to feed forward the follower by means of a hand-lever 39 attached to the shaft 38, so as to turn freely thereon, and a spring-pawl 40 arranged to engage the teeth of a ratchet-wheel 41 rigidly secured to the shaft 38. By these means the follower is moved forward, so as to slide the shingle-bolt over the platform between the parallel guides 34 after each shingle is cut therefrom, and thus move the shingle-bolt into position to have the next shingle cut from it, the follower being held at its adjustment by the engagement of the spring-pawl 40 with the teeth of the ratchet-wheel 41. The shingle-bolt is held in place on the platform by the carrier or guide 34 and a dog 42 attached at one end to the follower or plunger 35, so as to be moved forward therewith.

The numeral 43 designates a guide-bar secured to the top of the machine by means of thumb-bolts 44 passed through slotted plates 45 extending from the guide-bar 43, so that said guide-bar may be adjusted to and from the shingle-bolt according to the extent to which the shingle-bolt may be projected in front of the saw, said guide-bar serving to assist in guiding the shingle or brace the same while it is being sawed from the bolt.

The saw 6 at the opposite side of the machine on the shaft 4 is for the purpose of sawing the timber into blocks for use as shingle-bolts, or for sawing palings, laths, staves, or other articles from the timber. For the purpose of carrying the timber to be thus sawed up to the saw I employ a reciprocating table 46, provided at one end with a shoulder or block 47 extending across the table for the purpose of affording a bearing for the block or timber. This table is formed with a longitudinal slot 48, in which the saw 6 works as the table is moved up, and is also provided with a guide-bar 49 to afford a side bearing for the block or timber being sawed. The under side of this reciprocating table is provided with a block 50 at each end, which fits in a channel 51 formed in the top of the machine, so as to guide the table in its reciprocation.

The numeral 52 designates an extension at the end of the table next to the shoulder, into which extension the slot 48 extends, so that the saw 6 may enter the slot in the extension and thus permit the timber or block to be sawed beyond the end block or shoulder 47.

The table 46 has no permanent connection with the top of the machine, and consequently may be lifted off whenever desired without loss of time.

From practical operation of this machine it has been demonstrated to be capable of sawing from twelve to sixteen thousand shingles a day. Its parts are few and simple in construction and not liable to get out of repair, and the machine as a whole is easily manipulated and does not require skilled labor for operating the same.

I have illustrated and described with particularity what I consider to be the preferred details of construction of the several parts of the machine; but it is obvious that changes can be made in the details without departing from the spirit of the invention.

Having described my invention and set forth its merits, what I claim is—

1. In a shingle-sawing machine, the combination with the reciprocating shingle-bolt carriage provided with a rack-bar, on its under side, of the horizontally-arranged shaft provided with a mutilated gear adapted to coact with said rack-bar, said shaft having a vertical movement, and a vertical rod or pitman provided at its upper end with a bearing for the shaft of the mutilated gear, and a pedal or foot operating lever connected with the lower end of said pitman for moving the mutilated gear into operative relation with the rack-bar on the shingle-bolt carriage, substantially as and for the purposes described.

2. In a shingle-sawing machine, the combination with the shingle-bolt carriage provided with a rack-bar on its under side, of a mutilated gear attached to a rotatable shaft having a vertical movement, said gear being in line with the rack-bar, a vertical shaft having a bearing at its upper end for the shaft of said gear, a foot-lever connected with the vertical shaft for the purpose of raising the mutilated gear into operative connection with the said rack-bar, and means for retracting the shingle-bolt carriage while the teeth of the mutilated gear are out of engagement with the rack-bar, substantially as and for the purposes described.

3. In a shingle-sawing machine the combination with the reciprocating carriage having a rack-bar on its under side, and a vertically-movable rotatable mutilated gear in operative connection with said rack-bar to move the carriage up to a saw, of a platform pivoted to said carriage and having guides for a shingle-bolt, and a manually-operated lever for partially rotating said platform to present the shingle-bolt at an angle to the saw as the carriage is moved up to the saw, substantially as and for the purposes described.

4. In a shingle-sawing machine, the combination with the reciprocating shingle-bolt carriage, and rotatable platform thereon on which the shingle-bolt rests, of the follower bearing against said bolt for moving the bolt outward after each shingle is sawed therefrom, said follower consisting of a rectangular frame having cog-teeth on two of its sides, and a rotating shaft provided with cog-wheels to engage said teeth and having a lever rotating the shaft and means for locking the shaft in its rotation, substantially as and for the purposes described.

In testimony whereof I affix my signature in presence of two witnesses.

JOHN B. WALKER.

Witnesses:
C. C. O'BARR,
R. V. RAY.